United States Patent
Schuhbaeck et al.

(10) Patent No.: US 6,877,907 B2
(45) Date of Patent: Apr. 12, 2005

(54) ARRANGEMENT OF SEVERAL FERRULES FOR OPTICAL WAVEGUIDES AND PROCESS OF MANUFACTURING A BELT OF PLASTIC FERRULES

(75) Inventors: Andreas Schuhbaeck, München (DE); Patrick Weigert, Neufahrn (DE); Jürgen Bauer, Ingolstadt (DE)

(73) Assignees: Bayerische Motoren Werke AG, Munich (DE); TYCO Electronics AMP GmbH, Bensheim (DE)

( * ) Notice: Subject to any disclaimer, the term of this patent is extended or adjusted under 35 U.S.C. 154(b) by 349 days.

(21) Appl. No.: 09/837,610

(22) Filed: Apr. 19, 2001

(65) Prior Publication Data

US 2002/0001438 A1 Jan. 3, 2002

(30) Foreign Application Priority Data

Apr. 19, 2000 (DE) .......................................... 100 19 392

(51) Int. Cl.[7] ................................................ G02B 6/36
(52) U.S. Cl. .......................................... 385/78; 439/937
(58) Field of Search ................................ 439/590, 717, 439/937; 385/76–78

(56) References Cited

U.S. PATENT DOCUMENTS

| | | | |
|---|---|---|---|
| 3,797,107 A | 3/1974 | Anhalt et al. | |
| 3,901,575 A | 8/1975 | Hoover | |
| 4,400,874 A | 8/1983 | Craver et al. | |
| 4,464,817 A | 8/1984 | Johnson, Jr. et al. | |
| 4,466,692 A | * | 8/1984 | Sonoda |
| 4,795,074 A | 1/1989 | Francis | |
| 5,954,539 A | * | 9/1999 | Hornung ...................... 439/590 |

FOREIGN PATENT DOCUMENTS

| | | | |
|---|---|---|---|
| DE | 38 09 037 A1 | 9/1989 | ............ G02B/6/38 |
| DE | 38 09 038 A1 | 9/1989 | ............ G02B/6/36 |

OTHER PUBLICATIONS

German Search Report dated Aug. 11, 2003.
EPO Search Report of Jan. 4, 2002 and English Blank.

* cited by examiner

Primary Examiner—Khiem Nguyen
(74) Attorney, Agent, or Firm—Crowell & Moring LLP

(57) ABSTRACT

An arrangement of several ferrules for optical waveguides having at least one connection section, two ferrules respectively mutually connected by way of a connection section or mutually connected by way of a belt. In an advantageous embodiment, the ferrules are connected in one piece with the belt. In a process for producing a belt having plastic ferrules, the following process steps are implemented: Injection-molding a first plastic ferrule, conveying the finished plastic ferrule by a defined distance, and injection-molding a second plastic ferrule, so that it is connected with the first plastic ferrule. The process may further include belt segments which are injection-molded with the plastic ferrules.

15 Claims, 3 Drawing Sheets

ARRANGEMENT OF SEVERAL FERRULES FOR OPTICAL WAVEGUIDES AND PROCESS OF MANUFACTURING A BELT OF PLASTIC FERRULES

BACKGROUND AND SUMMARY OF THE INVENTION

This application claims the priority of German Application No. 100 19 392.7, filed in Germany on Apr. 19, 2000, the disclosure of which is expressly incorporated by reference herein.

The invention relates to an arrangement of several ferrules for optical waveguides as well as to a process for producing a belt having plastic ferrules.

In the case of all optical waveguides used for transmitting data, the problem arises that the end of the fiber must be positioned very precisely. The radial as well as the axial position tolerances are decisive for limiting the coupling losses. In almost all known technical solutions, a small tube-shaped part is pushed over the fiber end and is fastened there. This part is also called a ferrule, an insert or an optical contact. In the case of optical waveguides made of glass as well as those made of plastic, the problem arises of finding an efficient fastening method which meets the high technical demands. For this reason, a very reliable mass production process is required which can be automated. However, the ferrules often have to be introduced into the assembly process individually and in an oriented manner. When the supply takes place as bulk material, a component-specific vibro-conveyer and a component-specific vibrating rail must therefore be mounted in front of each assembly station. Other comparable separating and feeding devices are also known. The investment costs for these devices are considerable.

An object of the invention is to provide an arrangement for feeding the ferrules to an assembling machine without the requirement of high-expenditure separating and feeding devices.

This object is achieved by an arrangement of several ferrules for optical waveguides with at least one connection section, at least two ferrules being connected with one another by way of the at least one connection section.

Furthermore, the object is achieved by an arrangement of several ferrules for optical waveguides, the ferrules being arranged on a continuous belt and being fixed on the latter.

By connecting ferrules to form a belt, a simple solution is provided of feeding the ferrules to an assembling machine. Depending on the construction of the arrangement, only the position of the ferrules on or in the belt is defined, in which case, the ferrules can be held with play, or a rotation of the ferrules is prevented.

When plastic material is used for the ferrules and the belt, a process is provided for producing a belt having plastic ferrules which includes the following process steps:

injection-molding of a first plastic ferrule, conveying the finished plastic ferrule by a defined distance, and injection-molding a second plastic ferrule, so that it is connected with the first plastic ferrule.

The process is advantageous because the plastic ferrule as well as the belt can be produced in the same manufacturing step. Since no additional production step is required, the process according to the invention saves considerable costs.

Other objects, advantages and novel features of the present invention will become apparent from the following detailed description of the invention when considered in conjunction with the accompanying drawings.

DETAILED DESCRIPTION OF THE DRAWINGS

Figure 1:
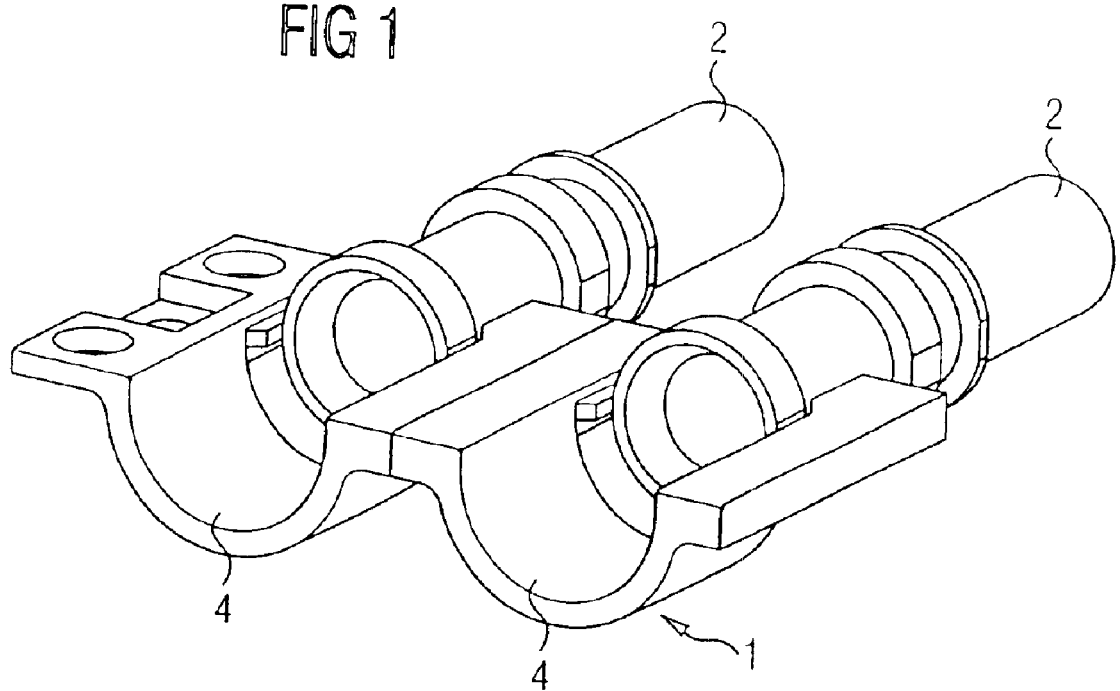
FIG. 1 is a view of two plastic ferrules connected in one piece with a belt.

FIG. 1 illustrates two belt segments 4 of a belt 1 with ferrules 2 molded thereto. The ferrules 2 are connected in one piece with belt segments 1, but can be separated from the belt in a relatively simple manner because cross-sectional reductions are provided at the connection points between the ferrules 2 and the belt 1. The belt segments 4 have a U-shaped design. This design provides advantages in the manufacturing process. During an injection-molding operation, the ferrules 2 are injection-molded around a mold core which, after the solidification of the plastic material, is pulled out again. A flat belt would impair the core pull.

Figure 2:
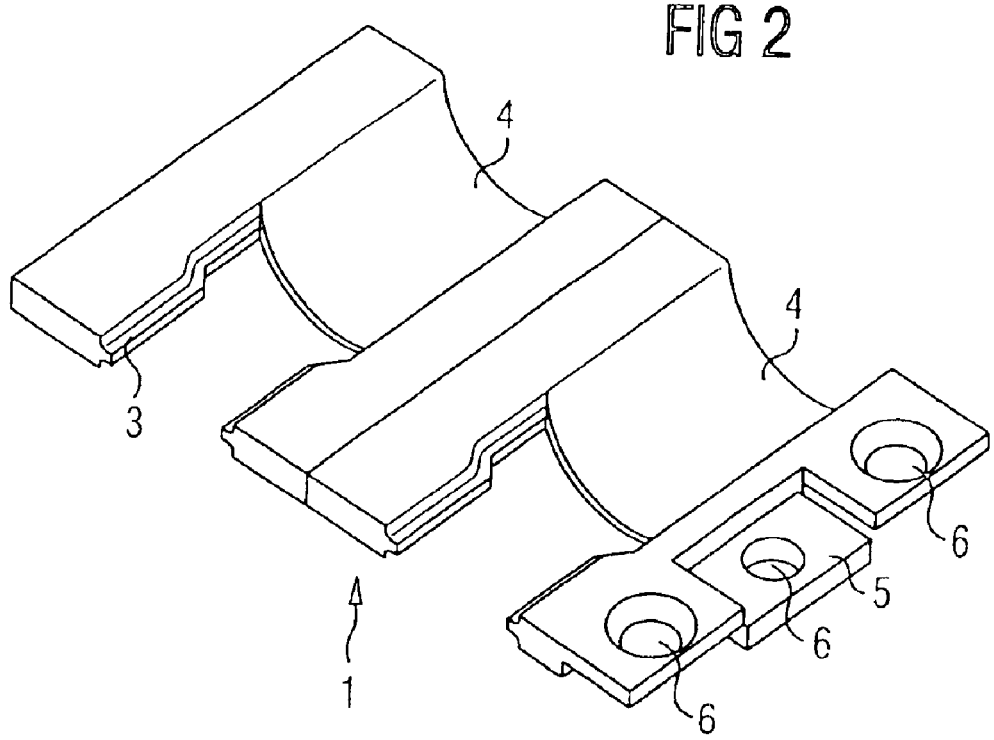
FIG. 2 is a view of two belt segments of the belt of FIG. 1.

FIG. 2 illustrates the belt segments 4 without the ferrules 2. In this representation, it is shown that the connection sections 3 have a significantly smaller cross-section than the adjacent sections. The removal is therefore very simple. However, since the belt 1 is continuous, the secure holding of the belt is ensured because of the U-shaped sections.

Molded-on sections 5 of the belt segments 4, which are provided for the injection-molding-on of another belt segment 4, have a so-called undercut geometry. When a new belt segment 4 is injection-molded to an existing one, a cold injection-molding seam is created which represents a potential cracking point. The openings 6 in the molded-on section 5 are penetrated when the plastic material is injection-molded-on, so that a "locking" takes place between the old belt segment and the newly injection-molded-on belt segment.

Figure 3:
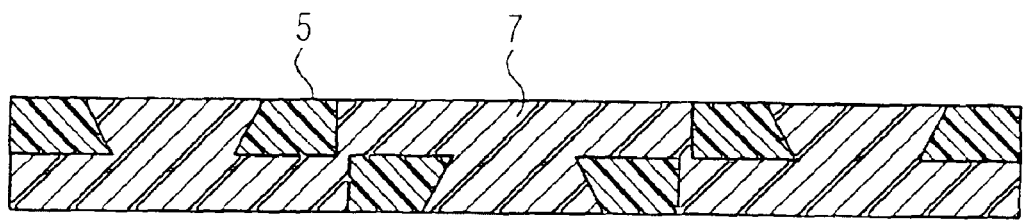
FIG. 3 is a view of the molding-on geometry of a belt segment of FIG. 2.

The molded-on section 5 in the embodiment of FIG. 2 is constructed in three parts, in which case the center part is offset with respect to the two adjoining parts. This is easily visible again in FIG. 3. In this cross-sectional view, in addition to the molded-on section 5, plastic injection molding material 7 of the newly injection-molded-on belt segment is also visible.

The injection molding material 7 of the new belt segment extends through the openings of the molded-on section 5. The openings are each conical, so that a secure hold is provided between the molded-on section 5 and the new belt segment, and the two parts cannot detach from one another either in the upward or in the downward direction. The secure and stable connection between the two belt segments 4 is important because belts are normally wound onto reels. This indicates that the belt is stressed with respect to bending and thus is subjected to a special strain.

Figure 4:
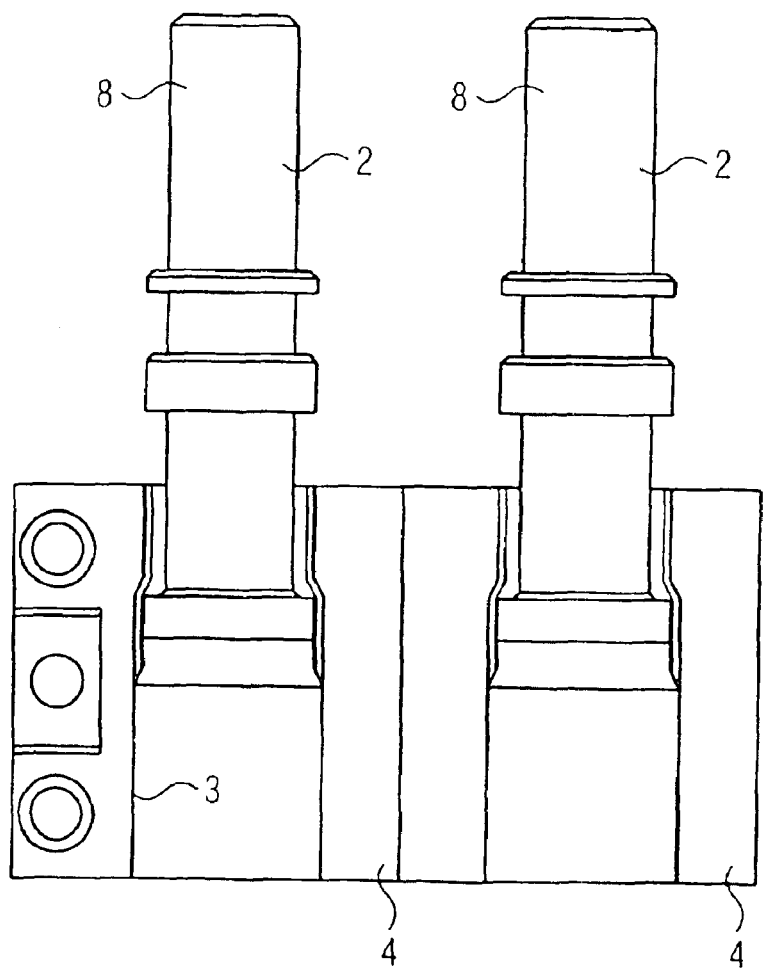
FIG. 4 is a top view of the arrangement of FIG. 1.

The position of the ferrules 2 in the belt segments 4 is again illustrated in FIG. 4. The connection of the ferrules 2 with the belt segments 4 is situated on the connection sections 3. A connector-side end 8 of the ferrules 2 therefore remains free of a burr, so that a finishing is not required.

Figure 5:
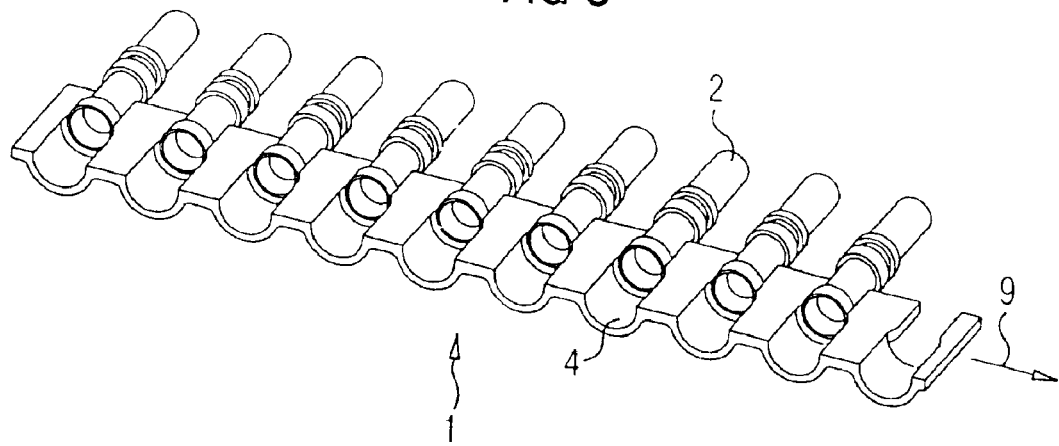
FIG. 5 is a view of the arrangement of FIG. 1 with a plurality of ferrules.

FIG. 5 illustrates how a plurality of belt segments 4 with ferrules 2 forms a belt 1. During the feeding into a machine, the belt 1 is moved in the direction of the arrow 9. The ferrule has already been removed from the first belt segment. The removal of the ferrules from the belt 1 can take place by the assembling machine. In this case, the holding tools for the holding during the fabrication with an optical waveguide can simultaneously be used as a tool for detaching the ferrules from the belt.

Figure 6:
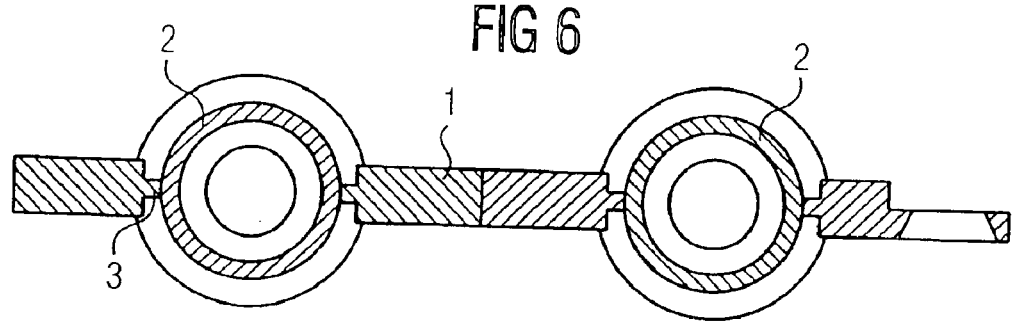
FIG. 6 is a cross-sectional view of the arrangement of FIG. 1.

FIG. 6 is a longitudinal sectional view of the belt with ferrules 2 still disposed therein. The thin connection webs of the connection sections 3 are easily visible. It is also clearly illustrated how the two shown belt segments blend into one another.

Figure 7:
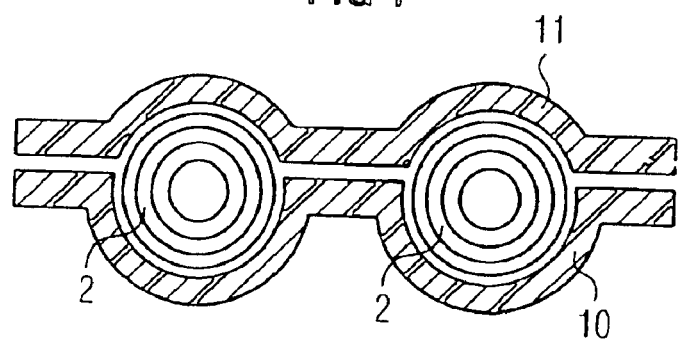
FIG. 7 is a view of another embodiment of an arrangement with ferrules and a belt.

In a simplified embodiment, the ferrules can be in a direct connection with one another. The ferrules are then no longer connected in one piece with the belt, but have a connection section which connects the ferrules with one another. The problem of this simplified arrangement is the stability of the entire belt. Furthermore, it is conceivable that the ferrules are not connected with the belt in one piece but are arranged on the latter by clamps. The clamping can take place without play or such that the ferrules can, for example, still rotate. The clamping can be implemented according to FIG. 7, where the belt includes a lower belt 10 and an upper belt 11. The ferrules 2 are received and held between the two belts 10 and 11. The removal from the belt in this case takes place by the spreading of the two belts or by the pushing-out of one belt side.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Arrangement of several ferrules for optical waveguides with a plurality of connection sections, wherein at least two ferrules are connected with one another by at least one of a plurality of connection sections, at least one of the plurality of ferrules and at least one of the plurality of connection sections are formed in one piece, and the connection sections form a belt on which the ferrules are detachably fixed, such that when the ferrules are detected, the connection sections remain together in belt form.

2. Arrangement according to claim 1, wherein the connection sections are flexible.

3. Arrangement according to claim 1, wherein the connection sections have a section fixing the ferrules to the belt of a reduced cross-section.

4. Arrangement according to claim 1, wherein the belt is a plastic injection-molded part.

5. Arrangement according to claim 4, wherein a belt segment for the injection-molding-on of another belt segment has a geometry by which the two belt segments are locked.

6. Arrangement according to claim 1, wherein the plastic ferrules are connected in one piece with the belt.

7. Arrangement according to claim 6, wherein the ferrules and the belt are connected with one another at an end area of the ferrule.

8. Arrangement according to claim 1, wherein the belt is formed by mutually connected U-shaped bridge segments.

9. Arrangement according to claim 1, wherein the belt includes an upper and a lower belt between which the plastic ferrules are received.

10. Arrangement according to claim 1, wherein the plastic ferrules are fixed on the belt such that the ferrules can be rotated about a longitudinal axis.

11. A method of coupling an optical waveguide, comprising:

providing an arrangement of ferrules, locating a ferrule of the arrangement over an end of the optical waveguide, separating the ferrule from the arrangement of ferrules, and fastening the ferrule to the optical waveguide, wherein the arrangement of ferrules has a plurality of connection sections, at least two ferrules are connected with one another by at least one of a plurality of connection sections, at least one of the plurality of ferrules and at least one of the plurality of connection sections are formed in one piece, and the connection sections form a belt on which the ferrules are detachably fixed, such that when the ferrules are detected, the connection sections remain together in belt form.

12. A method according to claim 11, wherein the connection sections are flexible.

13. A method according to claim 11, wherein the belt is formed by mutually connected U-shaped bridge segments.

14. A method of making ferrules for optical waveguides, comprising:

providing at least two ferrules with a plurality of connection sections, and connecting the at least two ferrules with one another by at least one of a plurality of connection sections, wherein at least one of the plurality of ferrules and at least one of the plurality of connection sections are formed in one piece, and the connection sections form a belt on which the ferrules are detachably fixed, such that when the ferrules are detected, the connection sections remain together in belt form.

15. A method according to claim 14, wherein the connection sections are flexible.

* * * * *